US012347327B2

(12) United States Patent
Bruce et al.

(10) Patent No.: US 12,347,327 B2
(45) Date of Patent: Jul. 1, 2025

(54) METHODS AND SYSTEMS FOR CREATING A SET OF ROUTES FOR AN AIRCRAFT TO TRAVEL THROUGH AN AIRSPACE

(71) Applicant: The Boeing Company, Chicago, IL (US)

(72) Inventors: Alan Eugene Bruce, Kent, WA (US); Ronen Elkoby, Los Angeles, CA (US); Trevor Craig Blanarik, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 439 days.

(21) Appl. No.: 17/740,684

(22) Filed: May 10, 2022

(65) Prior Publication Data

US 2022/0392357 A1 Dec. 8, 2022

Related U.S. Application Data

(60) Provisional application No. 63/195,809, filed on Jun. 2, 2021.

(51) Int. Cl.
*G08G 5/34* (2025.01)
*G05D 1/00* (2006.01)
*G08G 5/21* (2025.01)

(52) U.S. Cl.
CPC ............... *G08G 5/34* (2025.01); *G05D 1/106* (2019.05); *G08G 5/21* (2025.01)

(58) Field of Classification Search
CPC .. G08G 5/0039; G08G 5/0021; G08G 5/0034; G08G 5/0052; G08G 5/006; G05D 1/106; G06Q 10/047; G06Q 50/40; G01C 21/20
See application file for complete search history.

(56) References Cited

U.S. PATENT DOCUMENTS

| 5,121,325 A * | 6/1992 | DeJonge | G05D 1/0005 |
| | | | 701/123 |
| 8,108,138 B2 | 1/2012 | Bruce et al. | |
| 9,157,746 B2 | 10/2015 | Bruce et al. | |

(Continued)

OTHER PUBLICATIONS

Abdallah, L., et al., "Optimization of Operational Aircraft Parameters Reducing Noise Emission", Applied Mathematical Sciences, May 1, 2009, pp. 515-535, vol. 4, No. 11.

*Primary Examiner* — Ashley L Redhead, Jr.
(74) *Attorney, Agent, or Firm* — COATS & BENNETT, PLLC

(57) ABSTRACT

Methods and systems to develop routes for an aircraft to travel through an airspace. The system includes interface circuitry to receive one or more objectives and one or more constraints for the routes. Processing circuitry is configured to optimize the routes based on one or more of the input parameters. The processing circuitry is configured to: generate a set of routes that each comprise a different flight path through the airspace; rank the routes in the set based on how each of the routes dominates the other routes based on the one or more objectives and constraints; maintain dominant routes in the set and eliminate dominated routes from the set based on the rankings; generate additional dominant routes based on the one or more objectives and constraints; and supplement the set with the additional dominant routes.

20 Claims, 12 Drawing Sheets

(56) References Cited

U.S. PATENT DOCUMENTS

| | | | |
|---|---|---|---|
| 9,714,082 | B2 | 7/2017 | Shmilovich et al. |
| 10,096,251 | B2 | 10/2018 | Rysdyk |
| 10,145,699 | B2 | 12/2018 | Spinelli et al. |
| 2018/0265194 | A1* | 9/2018 | Gauglitz ............... H04W 4/021 |
| 2019/0340937 | A1* | 11/2019 | Villa .................... G08G 5/0039 |
| 2021/0063189 | A1* | 3/2021 | Coleman ............ G01C 21/3626 |
| 2021/0110502 | A1* | 4/2021 | Vaujour .................. B64G 1/10 |
| 2023/0237917 | A1* | 7/2023 | Schuppenhauer ..... G08G 5/045 |
| | | | 701/120 |

* cited by examiner

METHODS AND SYSTEMS FOR CREATING A SET OF ROUTES FOR AN AIRCRAFT TO TRAVEL THROUGH AN AIRSPACE

RELATED APPLICATIONS

This application claims priority from U.S. Provisional App. No. 63/195,809, filed 2 Jun. 2021, the disclosure of which is incorporated by reference herein in its entirety.

TECHNOLOGICAL FIELD

The present disclosure relates generally to determining routes for an aircraft to travel through an airspace and, more specifically, generating routes for the aircraft through an airspace based on one or more objectives and constraints.

BACKGROUND

A number of different parameters can be used to determine a route of an aircraft when moving through an airspace. One parameter is the acoustic impact the flight will have on an area, particularly during take-off and landing when the flight is at a lower altitude. Upon approach and departure aircraft are subject to ever-increasing noise restrictions which can limit low altitude routes or routes into particular airports that are located in or in proximity to densely populated areas. Other parameters include but are not limited to the amount of time for the aircraft to traverse a route, the amount of fuel that an aircraft uses along the route, geographic features along the route (e.g., mountains), no-fly zones, man-made features (e.g., radio towers, buildings), and an overall cost for an aircraft to fly a route.

Calculating a route for an aircraft using a single parameter is a relatively straight-forward task. The route can be optimized to reduce the ground noise as well as noise at monitoring stations. However, calculating a route that takes multiple parameters into account is more difficult. A traditional solution method of solving all the variables can be increasingly computationally expensive. Existing optimizations have been done for routes for controlling noise at a subset of specific points but they have not taken into account the entire population density. Further, these optimizations have not taken into account additional parameters.

Thus, there remains a need for an optimization system for generating routes that meet multiple parameters.

SUMMARY

One aspect is directed to a method of creating a route set for an aircraft to travel through an airspace. The method comprises: generating the route set comprising routes that each extend through the airspace and each comprises a different flight path through the airspace; ranking the routes based on one or more objectives and constraints; deleting from the route set one or more of the routes that rank below a predetermined threshold; determining that the route set is incomplete after deleting the one or more routes and generating additional routes based on the one or more objectives and constraints; and supplementing the route set with the additional routes that rank above the predetermined threshold.

In another aspect, the method comprises selecting one of the routes from the route set for the aircraft to travel while flying through the airspace.

In another aspect, ranking the routes based on the one or more objectives and constraints comprises for each of the routes: calculating an expected acoustic impact of the route on a geographic area using a sound propagation module stored in memory circuitry; and ranking the route based on the expected acoustic impact of the route on a geographic area.

In another aspect, ranking the routes based on the one or more objectives and constraints comprises for each of the routes: calculating an expected fuel consumption of the aircraft traveling the route using an aircraft kinematic module stored in memory circuitry; and ranking the route based on the expected fuel consumption of the aircraft traveling the route.

In another aspect, the method comprises deleting one or more of the routes from the route set that violate one of the constraints.

In another aspect, generating the route set comprises: creating parent routes that each extend through the airspace; assigning one or more waypoints to each of the parent routes; varying the parent routes at one or more of the waypoints and creating new child routes that extend through the airspace and that are different than the parent routes; and populating the route set with both the parent routes and the child routes.

In another aspect, varying the parent routes and creating the child routes comprises changing an aircraft control setting at one or more of the waypoints on the parent routes.

In another aspect, varying the parent routes and creating the child routes comprises changing a direction of the routes at one or more of the waypoints.

In another aspect, the method comprises creating a Pareto set from the routes and ranking the routes based on a graphed position of the routes relative to a leading edge of the Pareto set.

In another aspect, the method comprises ranking the routes based on the graphed position of the routes relative to a gap in the leading edge of the Pareto set.

One aspect is directed to a method of creating a route set that comprises a plurality of routes for an aircraft to travel through an airspace. The method comprises: populating a route set with routes that extend through the airspace with each of the routes being different; ranking the routes based on one or more objectives; deleting one or more routes from the route set that rank below a predetermined threshold based on the one or more objectives; and deleting one or more of the routes that violate a constraint applied to the airspace.

In another aspect, the method comprises: after deleting the one or more routes, determining that a convergence criteria has not been met; creating additional routes that extend through the airspace; supplementing the route set with the additional routes; and selecting one of the routes from the route set for the aircraft to travel while flying through the airspace.

In another aspect, ranking the routes based on the one or more objectives comprises ranking the routes based at least on an acoustic impact of the route on a geographic area.

In another aspect, the method comprises ranking the routes based on an expected fuel consumption of the aircraft traveling along the route.

In another aspect, deleting one or more of the routes that violate the constraint applied to the airspace comprises deleting the one or more routes that extend into a prohibited airspace.

One aspect is directed to a control unit to develop routes for an aircraft to travel through an airspace. The control unit comprises: interface circuitry configured to receive one or more objectives and one or more constraints for the routes;

and processing circuitry configured to optimize the routes. The processing circuitry is configured to: generate a route set comprising routes that each extends through the airspace and each comprises a different flight path through the airspace; rank the routes based on the one or more objectives and constraints; delete from the route set one or more of the routes that rank below a predetermined threshold; after deleting the one or more routes, determine that the route set is incomplete and generate additional ones of the routes based on the one or more objectives and constraints; and supplement the route set with the additional ones of the routes that rank above the predetermined threshold.

In another aspect, the processing circuitry is further configured to select one of the routes of the route set for the aircraft to travel while flying through the airspace.

In another aspect, the processing circuitry is further configured to display the route set as a Pareto set on a display.

In another aspect, the processing circuitry is configured to rank the routes based on an acoustic impact of the routes on a geographic area.

In another aspect, the processing circuitry is configured to rank the routes based on fuel consumption of the aircraft traveling the routes.

The features, functions and advantages that have been discussed can be achieved independently in various aspects or may be combined in yet other aspects, further details of which can be seen with reference to the following description and the drawings.

DETAILED DESCRIPTION

Figure 1:
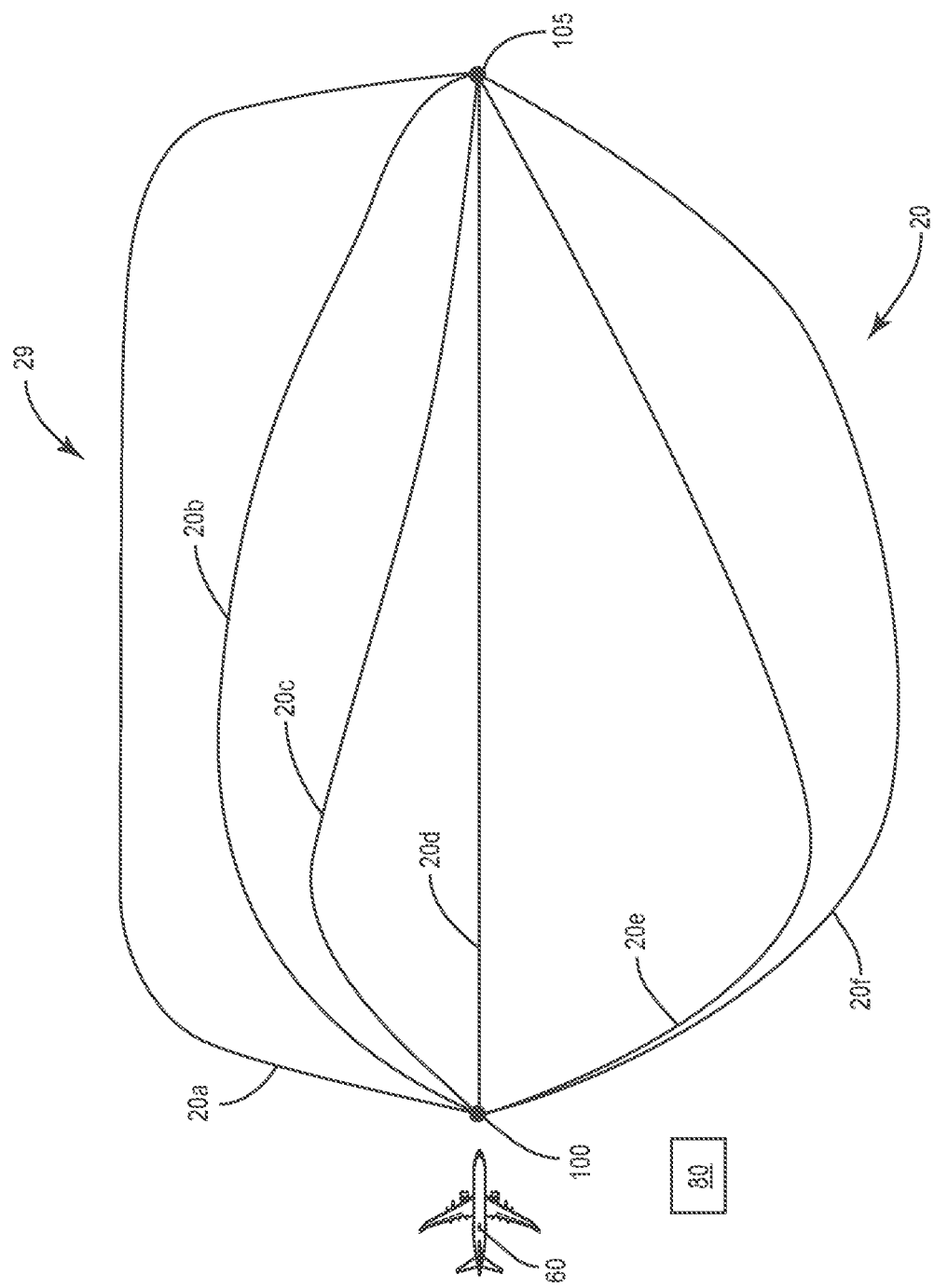
FIG. 1 is a schematic diagram of routes that extend through an airspace between an origination and a destination.

The present application is directed to methods and systems for developing a family of routes for an aircraft to travel along when moving through an airspace. As illustrated in FIG. 1, control unit 80 initially generates a first set of routes 20 that extend through the airspace 29. The routes 20 each begin at the origination 100 and terminate at the destination 105. The control unit 80 that develops the family of routes 20 can be located in one or more locations, including on the aircraft 60 and one or more land-based locations.

Each of the routes 20 includes one or more different change points that cause the route to differentiate from the other routes 20. In one example, a change point includes a change in an aircraft setting, such as a flap setting or a throttle setting. In another example, a change point includes a course alteration such as change in altitude or bearing.

Figure 2:
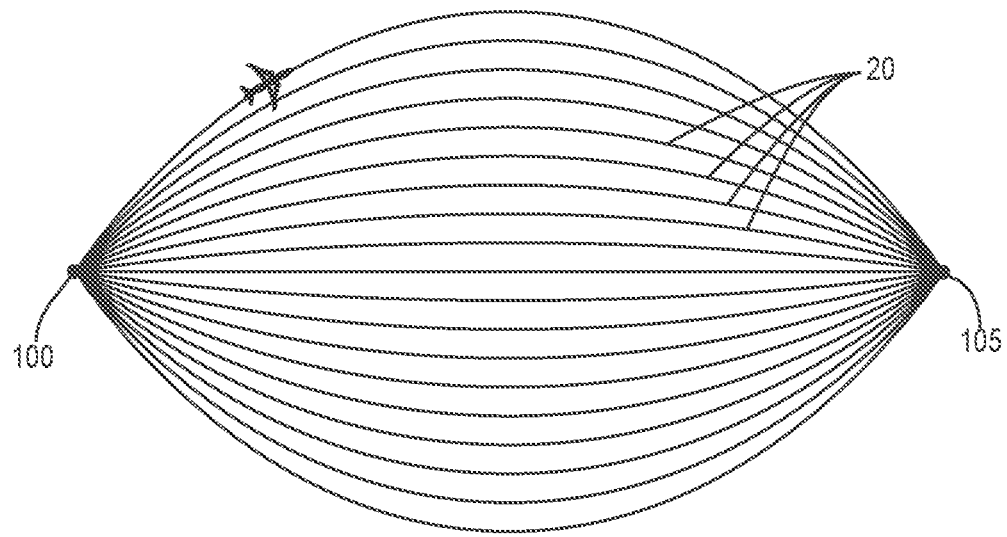
FIG. 2 is a schematic diagram of routes that extend through an airspace between an origination and a destination.

In the example of FIG. 1, a first set of routes 20a-20f (referred to as a whole as routes 20) are generated that extend between the origination 100 the destination 105. Each of the routes 20a-20f is a potential flight path that can be traveled by the aircraft 60 while traveling through the airspace 29 between the origination 100 and destination 105. The number of routes 20 that are initially generated can vary. FIG. 1 illustrates an example with six routes 20a-20f. FIG. 2 illustrates an example with a greater number of routes 20. The families can be arranged in various configurations, including a non-symmetrical configuration of routes 20 as illustrated in FIG. 1 or a symmetrical arrangement as illustrated in FIG. 2.

In one example, the routes 20 are randomly created and provide initial solutions that cover the airspace 29 between the origination 100 and destination 105. Each route 20 is considered a reasonable option for the aircraft 60 to travel through the airspace 29.

Figure 3:
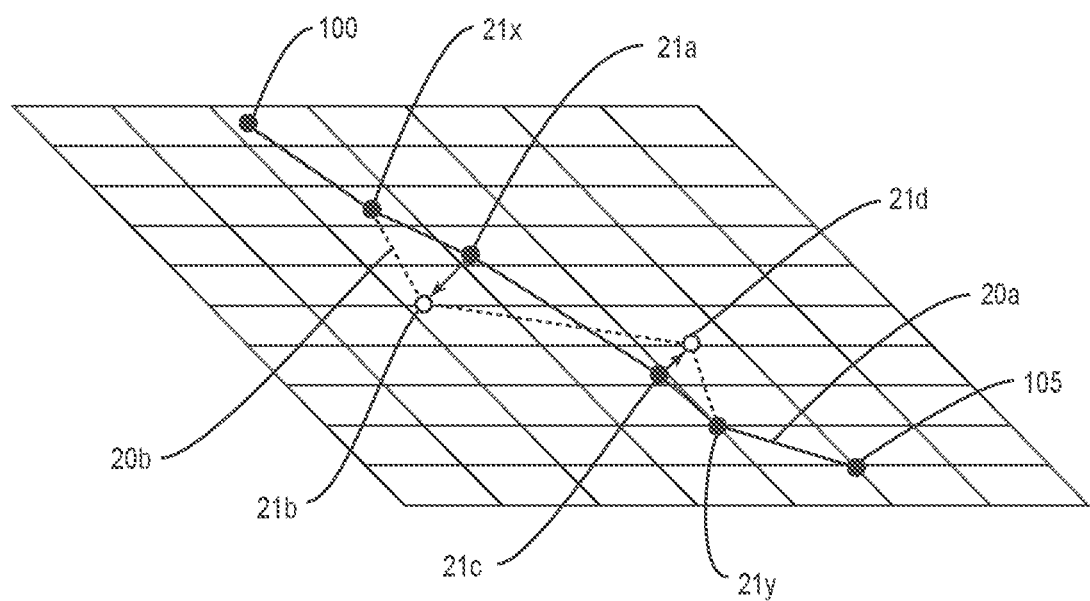
FIG. 3 is a schematic diagram of a parent route and a child route that extend through an airspace.

Once the first routes 20 are created, additional child routes 20 are created as variations of the original parent route. One method of creating child routes 20 is through simple mutation as illustrated in FIG. 3. For simple mutation, the parent route 20a is copied into a child route 20b and random changes are made. The control unit 80 randomly selects one or more waypoints 21 and randomly shifts their location. In the example of FIG. 3, waypoint 21a is shifted away from the parent route 20a to new child waypoint 21b. Waypoint 21c is shifted away from parent route 20a to child waypoint 21d. The child route 20b is then formed by one or more sections that overlap with the parent route 20a (e.g., section 100-21x, section 21y-105) as well as one or more non-overlapping sections (e.g., section 21x-21y). The mean size of the shift of the waypoints 21 between the parent route 20a and child route 20b can vary as the algorithm progresses. Initially, the shifts can be large in an attempt to explore the airspace 29. The size of the shift is eventually reduced in an effort to refine the child routes 20b. In one example, each of the child waypoints 21 is shifted an equal distance away from the corresponding parent waypoint 21. In another example, different child waypoints 21 shift different amounts.

In one example, the waypoints 21 are randomly selected along the length of the parent and child routes 20a, 20b. In another example, the waypoints 21 coincide with a change point along the route 20.

Figure 4:
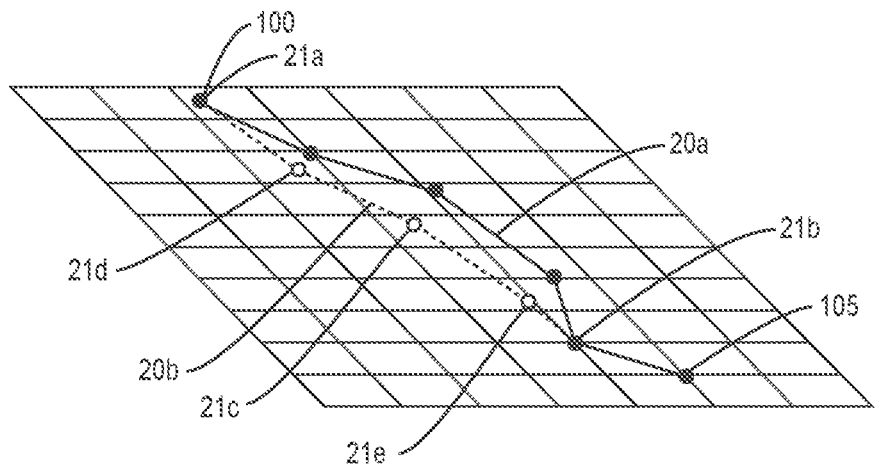
FIG. 4 is a schematic diagram of a parent route and a child route that extend through an airspace.

Another variation for generating a child route 20b is referred to as path mutation. In path mutation, a random waypoint 21 along the parent route 20a is selected where the child route 20b diverges. Another waypoint 21 is randomly selected for where the child route 20b merges back to the parent route 20a. In the example of FIG. 4, the origination point 100 is the initial waypoint 21a where the child route 20b diverges from the parent route 20a, and waypoint 21b is where the child route 20b merges back with the parent route 20a. Another waypoint 21 along the child route 20 is randomly selected from the subset of waypoints 21 between the diverge and the merge. This waypoint 21 will have the maximum offset. In the example of FIG. 4, waypoint 21c is the maximum offset that the child route 20b diverges from the parent route 20a. The extent of the offset can be randomly generated or can be based on a mathematical relationship with one or more other waypoints 21. In the path mutation, an offset is applied in the same direction to all the other waypoints 21 along the child route 20b. The magnitude of the offset ramps up between the diverge and max offset waypoints. Then the magnitude ramps back down and the child route 20b merges back to the parent route 20a. This operation produces smoother transitions and speeds convergence.

Figure 5A:
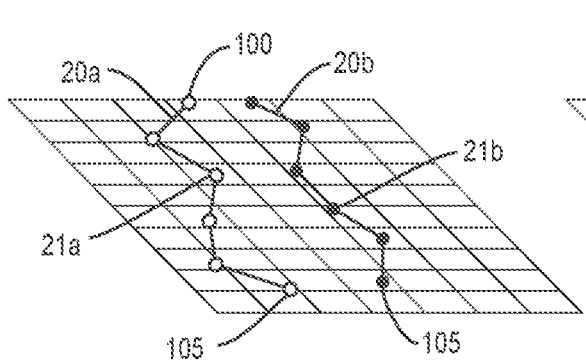
FIG. 5A is a schematic diagram of a pair of parent routes that extend through an airspace.
Figure 5B:
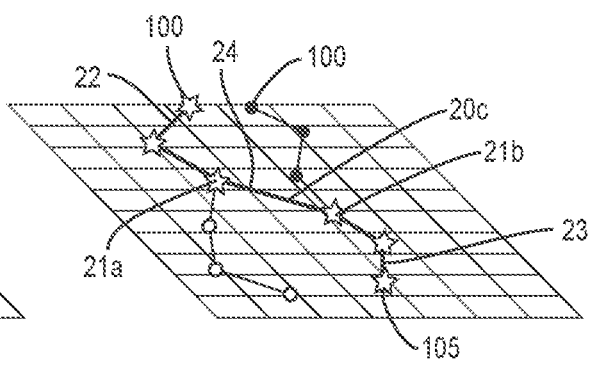
FIG. 5B is a schematic diagram of a child route that is generated based on the parent routes of FIG. 5A.

Another example of creating child routes 20 combines multiple parent routes 20. The control unit 80 randomly picks a waypoint 21 to diverge from one parent route 20 and randomly selects another waypoint 21 to merge into a second parent route 20. The child route 20 is formed using sections of both parent routes 20 and the new intermediate section that spans between the two parent routes 20. FIGS. 5A and 5B illustrate an example with a pair of parent routes 20a, 20b. Route 20a includes waypoint 21a and route 20b includes waypoint 21b. The child route 20c as illustrated in FIG. 5B includes a first section 22 that corresponds to the beginning of parent route 20a from the origination 100 to waypoint 21a, and a second section 23 that corresponds to parent route 20b from waypoint 21b to the destination 105. The child route 20c also includes a new section 24 that extends between waypoints 21a and 21b.

Figure 6A:
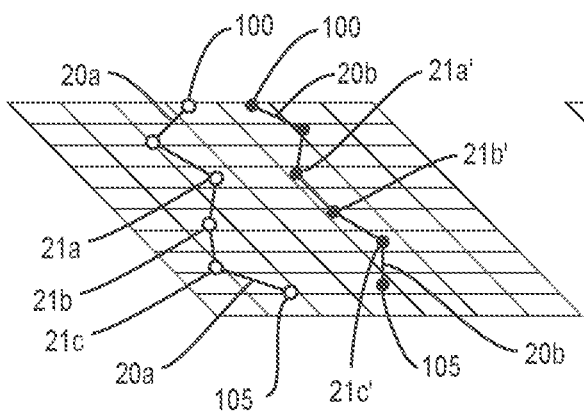
FIG. 6A is a schematic diagram of a pair of parent routes that extend through an airspace.
Figure 6B:
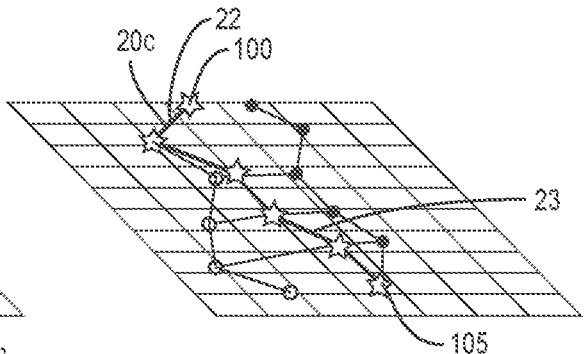
FIG. 6B is a schematic diagram of a child route that is generated based on the parent routes of FIG. 6A.

Another example of is a merge combination as illustrated in FIGS. 6A and 6B. Parent routes 20a, 20b each extend between an origination 100 and a destination 105 and each include waypoints 21 along their lengths (i.e., waypoints 21a, 21a', 21b, 21b', 21c, 21c'). The child route 20c includes a first section 22 that corresponds to the parent route 20a and a second section 23. The second section 23 smoothly transitions between the waypoints 21a, 21a', 21b, 21b', 21c, 21c' of the parent routes 20a, 20b.

In one example, the routes 20 consist of a series of discrete sections that extend directly between the waypoints 21. In another example, the control unit 80 converts the discrete sections and waypoints 21 into a path that can be flown by the aircraft 60. In one example, the control unit 80 uses a kinematic model to calculate aspects of the route 20, such as turns, climbs, and descents. The kinematic model also accounts for performance characteristics of the aircraft 60, atmospheric conditions, etc. when calculating the route 20.

Once the routes 20 are created, the control unit 80 evaluates the routes 20 based on one or more constraints and objectives. Constraints are aspects that should be met for the route to be a feasible option for traveling through the airspace 29. Examples of constraints include but are not limited to geographic obstacles such as mountains, man-made obstacles such as building and towers, altitude requirements, and no-fly zones such as established at military installations and densely-populated areas. In one example, the route 20 is removed from the set of routes 20 if a constraint is violated. For example, a route 20 that extends through a mountain is eliminated. In another example, the route 20 remains in the set of routes 20 if a constraint is violated (e.g., a route 20 that moves through a no-fly zone based on population density) may remain in the route set for further evaluation. For these routes 20, the evaluation includes assigning a value to each constraint. If a route 20 violates a constraint, a measure of an extent of violation is calculated. For example, a route 20 that narrowly enters a no-fly zone has a small constraint value while a route that travels through a center of a no-fly zone has a large constraint value. Routes 20 with a constraint value above a predetermined value are eliminated from the set. Routes 20 with a constraint value below a predetermined value are evaluated to determine if the constraint violation can be removed and the route 20 can remain in the set. For example, the route 20 that barely enters a no-fly zone can be altered to prevent this violation and remain in the set.

The control unit 80 also evaluates the routes 20 based on one or more objectives. Objectives are aspects of a flight that are to be optimized. Various objectives can be evaluated, including but not limited to an acoustic impact on a geographic area, fuel consumption, travel time, and flight distance.

Figure 7:
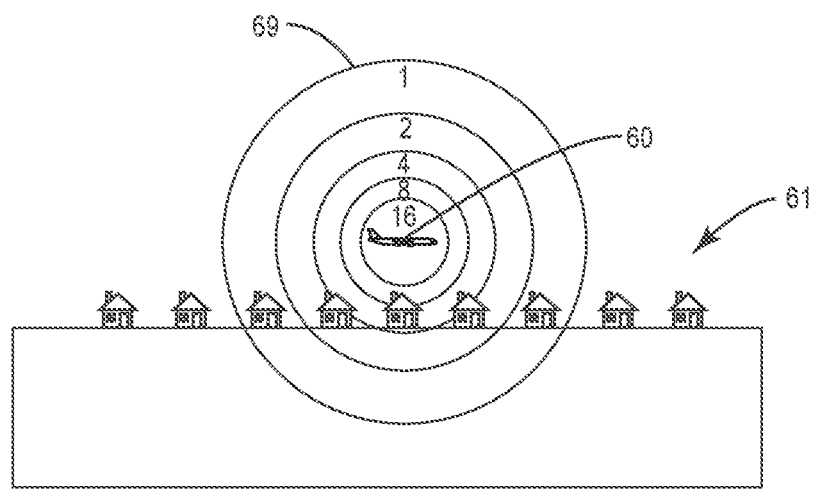
FIG. 7 is a schematic diagram of a noise propagation pattern positioned over a geographic area.

For acoustic impact, the amount of noise produced by the aircraft for a geographic area is driven by the aircraft state, such as but not limited to thrust, flap settings, and landing gear position. Acoustic impact is further driven by the altitude of the aircraft 60. These aspects are illustrated in FIG. 7 that shows a propagation pattern 69 of the acoustic impact of an aircraft 60 as it moves above a geographic area 61. The acoustic impact objective can be evaluated for one or more points along a route 20, or is integrated along the route 20 to get a total acoustic impact of the route 20.

Figure 8:
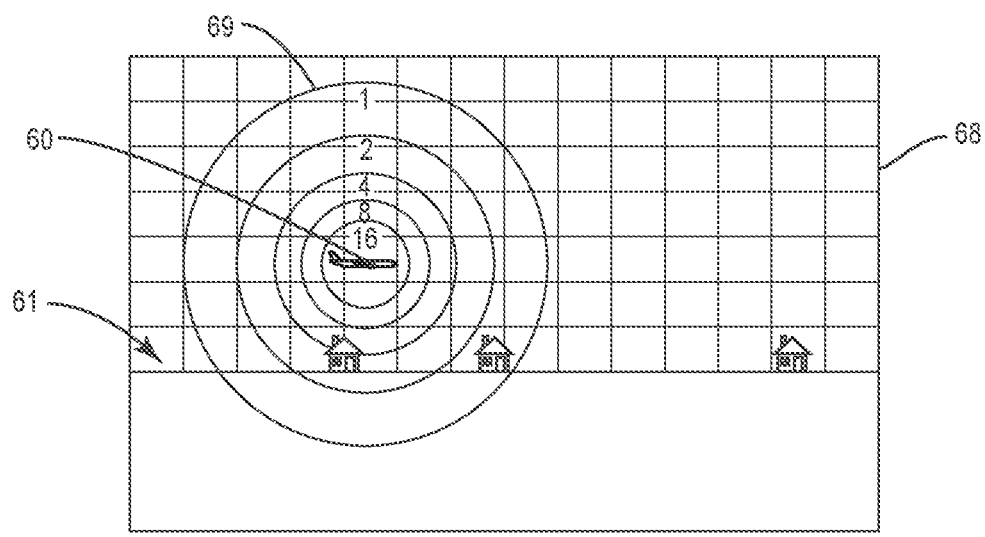
FIG. 8 is a schematic diagram of a noise propagation pattern and a grid positioned over a geographic area.

In one example, calculating the acoustic impact is computationally intensive for the control unit 80. To save time and processing capacity, a 3D grid 68 is constructed around an airspace above a geographic area 61 as illustrated in FIG. 8. At various points on the grid 68, the acoustic impact is calculated for a given aircraft state and saved by the control unit 80. These saved calculations can then be used to determine the acoustic impact for a particular route 20. These pre-calculations save time and computational capacity during the optimization. In one example, the system pre-calculates a 3D grid for the geographic area 61 around an airport.

Certain aspects of a route 20 can be evaluated as either a constraint or simply a factor that effects one or more objectives. For example, altitude of the aircraft 60 can be a constraint. If a predetermined altitude cannot be reached at one or more of the waypoints 21, the route 20 is considered a constraint violation. The constraint can be used to eliminate the route 20 from the set or can be given a value and attempted to be satisfied to remain in the set. In another example, the altitude is not a constraint but rather a factor that affects an objective. In this example, the kinematic model attempts to achieve the desired altitudes at the waypoints 21. If the altitude cannot be reached at a particular waypoint 21, the route 20 provides for the aircraft 60 to pass through the waypoint 21 and continue to ascend until reaching the desired altitude. The lack of altitude at a waypoint 21 is not a constraint violation but may negatively affective a score of the route 20 for one or more objectives. For example, a route 20 with a lower altitude can have a higher acoustic impact on a geographic area.

Figure 9:
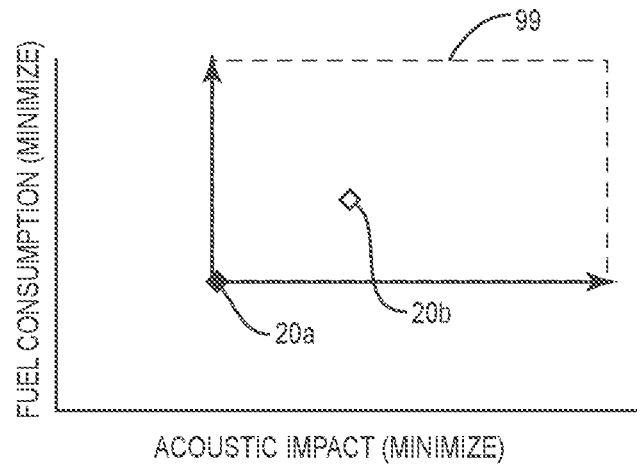
FIG. 9 is a plot of routes that are evaluated based on acoustic impact and fuel consumption objectives.

The evaluated routes 20 are then ranked based on dominance in one or more objectives and constraints. This includes how much a route 20 dominates other routes 20 in the set. In one example, the routes 20 are ranked based on acoustic impact and fuel consumption objectives. FIG. 9 illustrates a plot that ranks routes 20 based acoustic impact which is measured along the x-axis and on the fuel consumption which is measured along the y-axis. In this plot, two specific routes 20a, 20b are noted, as well as an area 99 that generally discloses the plot locations of multiple other routes 20 that are not specifically illustrated. The first route 20a dominates the other routes 20 that fall within the area 99, and specifically route 20b. In this example, the first route 20a is a better solution in both objectives and dominates the second route 20b and other routes 20 in area 99.

Figure 10:
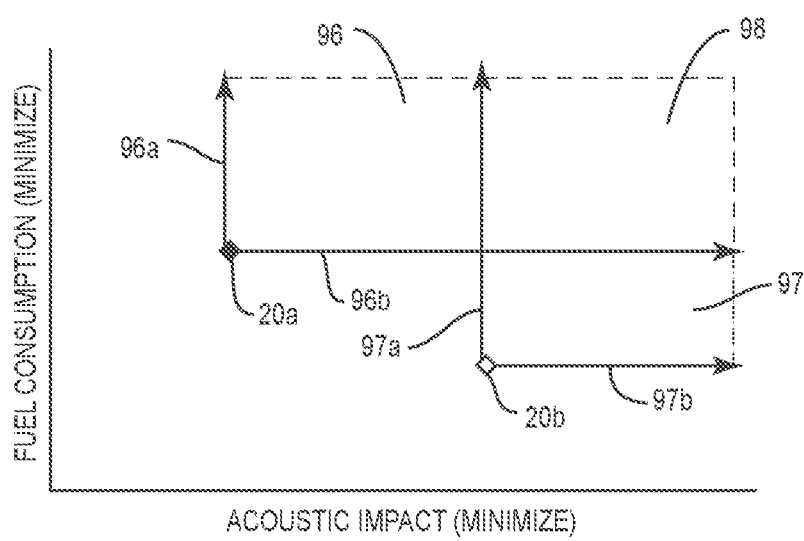
FIG. 10 is a plot of routes that are evaluated based on acoustic impact and fuel consumption objectives.

FIG. 10 illustrates an example in which the first route 20a dominates for acoustic impact but route 20b dominates for fuel consumption. Neither route fully dominates the other and the dominance ranking is a tie.

Figure 10A:
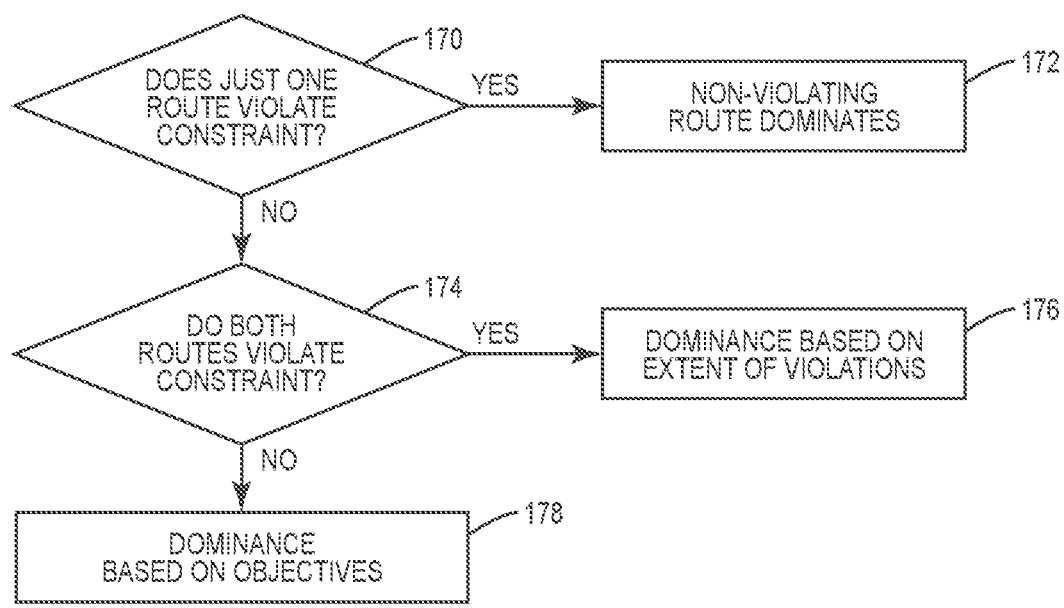
FIG. 10A is a flowchart diagram of a method of evaluating dominance between two routes.

FIG. 10A illustrates one method of evaluating the dominance between a first route 20A and a second route 20B. The evaluation takes constraints and objectives into account. The evaluation determines whether just one of the routes 20A, 20B violate one or more of the constraints (block 170). If this situation occurs, the route 20 that does not violate a constraint dominates the other route 20 (block 172).

The evaluation continues to determine whether both routes 20A, 20B violate one or more of the constraints (block 174). If both routes 20A, 20B violate the constraints, the dominance is based on the extent of violation (block 176). For each route 20 a measurement is taken on how much the constraint is violated. The multiple constraints are compared to minimize the size of the violations.

If both routes 20A, 20B do not violate the one or more constraints the dominance is based on the evaluation of the one or more objectives as explained above as illustrated in the examples of FIGS. 9 and 10(block 178).

In another example, routes 20 that violate one or more constraints are eliminated from the route set. The remaining routes 20 are ranked based on their dominance.

After the routes 20 are ranked based on dominance, specific routes 20 are selected to remain in the population set based upon their dominance score. The selection process favors routes 20 that are dominated by fewer other solutions. For example using the example of FIG. 10, routes 20a and 20b may be selected to remain in the population set based on their dominance scores. Routes 20 that have scores that fall within area 98 are dominated and therefore are eliminated from the set. In one example, routes 20 that fall within areas 96, 97 remain in the set with other routes 20 being eliminated. In another example, routes 20 that fall along lines 96a, 96b, 97a, 97b remain and the remainder of the routes 20 in areas 96, 97 are eliminated. In one example, the selected routes form a Pareto set.

Figure 11:
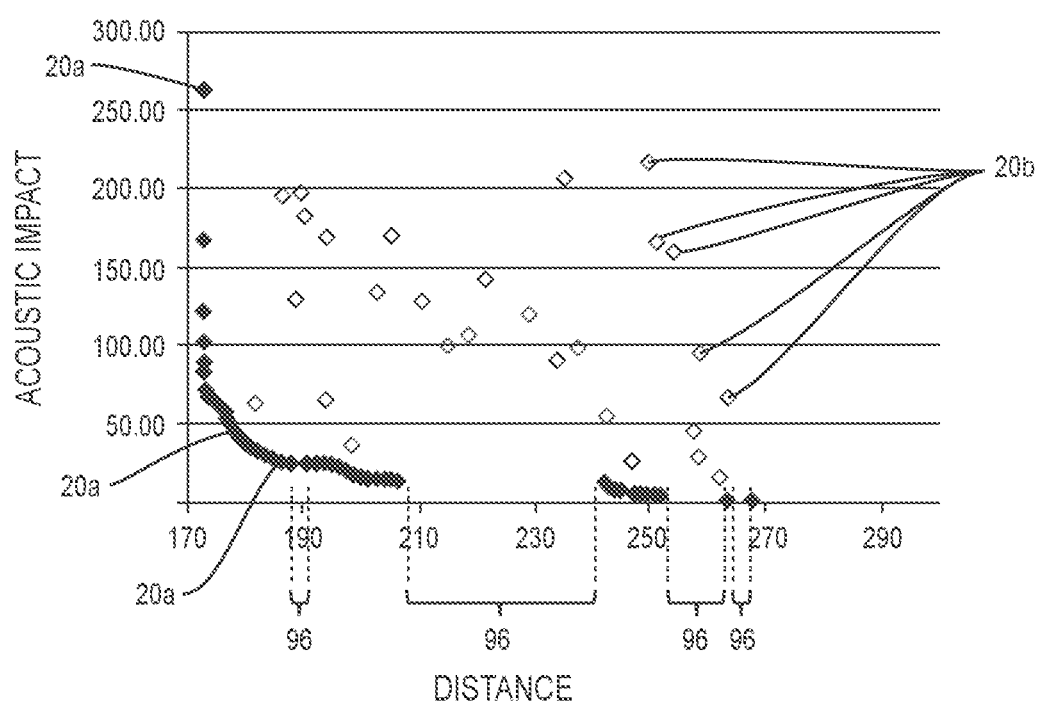
FIG. 11 is a Pareto plot of routes that are evaluated based on acoustic impact and fuel consumption objectives.

FIG. 11 illustrates a plot of multiple routes 20 that are graphed according to scores for acoustic impact and distance. As illustrated, a first sub-set of the routes 20a are non-dominated and remain in the set. This sub-set of routes 20a is graphed along the leading edge of the data set. A second sub-set of the routes 20b are dominated. These dominated routes 20b are those that do not provide the best option for meeting the one or more objectives and are eliminated from the route set. The number of routes 20 that are generated, evaluated, and selected can vary.

As illustrated in FIG. 11, gaps 96 can occur within the selected set of routes 20. These gaps 96 occur due to the lack of generated routes 20 that provide a solution for one or more of the objectives. The selection criteria for which routes 20 are selected to remain in the set includes those routes 20 that dominate the other routes 20 in one or more objectives. As illustrated in the plot of FIG. 11, the routes 20 can be displayed as a Pareto set. These selected routes 20a form an outer edge of the total graphed set of routes 20.

Another selection criteria for which routes 20 are selected to remain in the set includes the proximity of a route 20 to a gap 96 in the selected set. A route 20 that falls within an existing gap 96 has a higher score and is more likely to be selected than a route 20 that is farther away from an existing gap 96. In one example, a score is calculated for each of the routes 20 based on their dominance. The score can be further affected based on the location of the score relative to the one or more gaps 96. In one example, a weighting factor is applied to the scores that weighs the position relative to one or more gaps 96.

The control unit 80 continues to process routes 20 and add to the selected set until a converge criteria is met. Prior to the convergence, the processing circuitry 81 continues to generate, rank, and select new routes 20 that are included in the set. Once a convergence is obtained, the process ends and the set is used to select a route 20 that is flown by the aircraft 60 through the airspace 29.

Various converge criteria can be used to determine whether additional routes 20 are needed to stock the set. In one example, the control unit 80 monitors the number of generations of new routes 20 without any new routes 20 added to the selected set. The control unit stops processing when the number moves above a predetermined threshold. In another example, the control unit 80 processes a predetermined number of generations of routes 20 and then stops.

Figure 12:
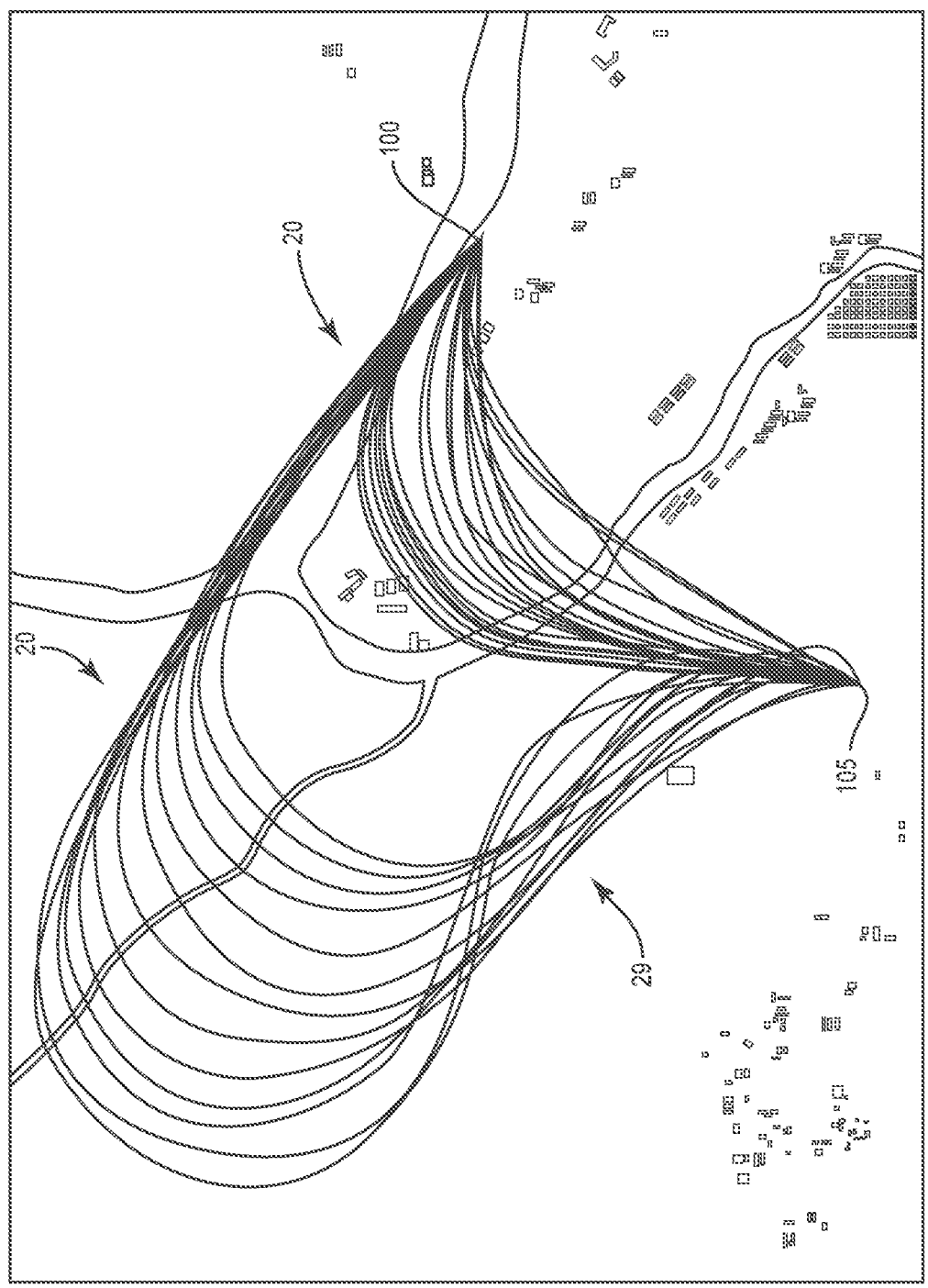
FIG. 12 is a diagram of routes that extend through an airspace between an origination and a destination.
Figure 13:
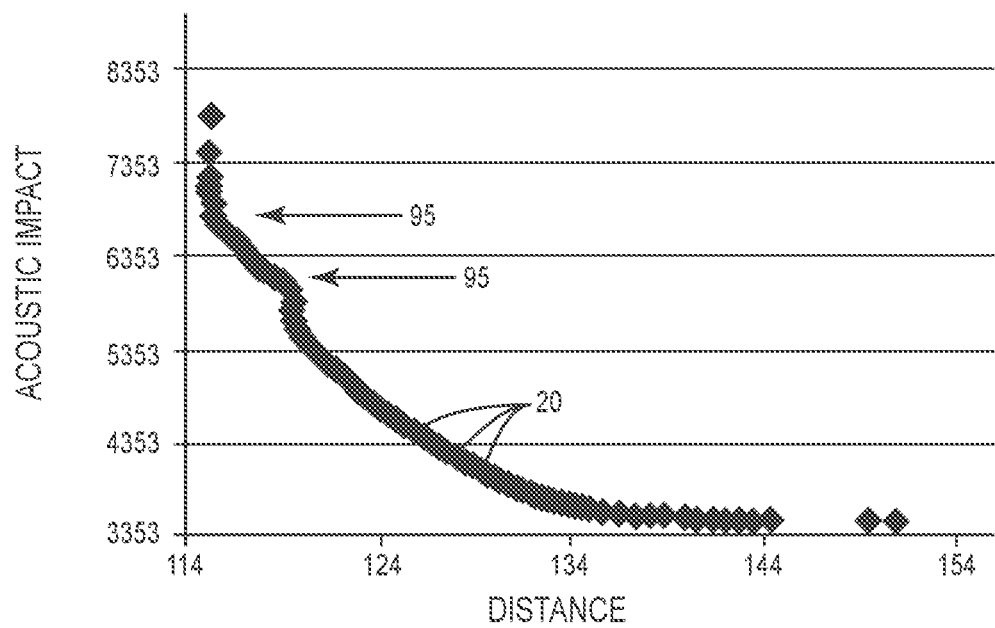
FIG. 13 is a Pareto plot of routes that are evaluated based on acoustic impact and fuel consumption objectives.

FIGS. 12 and 13 illustrate an example of optimizing routes 20 through an airspace 29. As illustrated in FIG. 12, a family of routes 20 are generated that each extend through the airspace 29 that extends between an origination 100 which is an airport to a destination 105. In this example, the origination is an airport where the flight begins and the destination 105 is a point along the flight path that is away from the airport and beyond a populated area. In this example, the control unit 80 is optimizing two objectives: acoustic impact over the populated area; and the length of the route 20. As illustrated in FIG. 12, the two different objectives for the generated routes 20 play against each other. The shorter paths in closer proximity to the airport 100 immediately fly over densely populated areas. The longer paths fly along a nearby river to gain altitude and then turn toward the destination 105 after moving over a more rural area.

FIG. 13 illustrates the routes 20 displayed in a Pareto plot with the distance of the route 20 measured along a first axis and an acoustic impact measured along a second axis. Each route 20 provides a data point on the plot. As illustrated in the plot, most neighboring solutions in the plot are identical except for a small difference at a few waypoints along the routes 20. The Pareto plot further illustrates discontinuity or inflection points 95 where the analysis indicates a contrast between meeting the differing objectives. In one example, the inflection points 95 indicate a substantial change in the route 20. For example, the route 20 could jump from one side of a densely populated area to the other side of the area.

Figure 14:
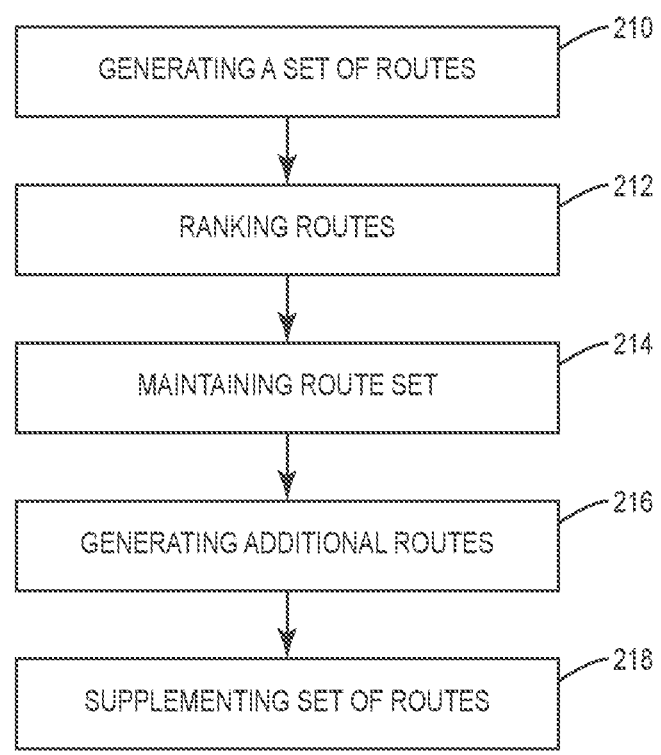
FIG. 14 is a flowchart diagram of a method of creating a set of routes that extend through an airspace between an origination and a destination.

FIG. 14 illustrate one method of developing routes for an aircraft 60 to move through an airspace 29. The method includes generating a first set of routes 20 that extend through the airspace 29 (block 210). The routes 20 extend between an origination 100 and a destination 105. The routes 20 are ranked based on dominance (block 212). The dominance is calculated for each route 20 based on one or more objectives and/or constraints. The routes are maintained in a route set (block 214). In one example, dominated routes 20 that fall below a predetermined threshold are eliminated from the set with the dominant routes 20 that are above the predetermined threshold remaining in the set.

Additional routes 20 are generated based on variations of the first set of routes 20 (block 216). The additional routes 20 can be ranked and dominant routes 20 that are above the predetermined threshold are added to the set (block 218). In one example, a dominance score is calculated for each route 20. Routes 20 with a dominance score above a predetermined amount remain in the set with those with a lower score being eliminated.

In one example, one of the routes 20 is then selected from the maintained set for the aircraft 60 to travel through the airspace 29.

In one example, after the routes 20 are generated, the routes 20 are evaluated to determine if they violate a constraint. The routes 20 that violate a constraint are eliminated from the set prior to ranking the routes.

Figure 15:
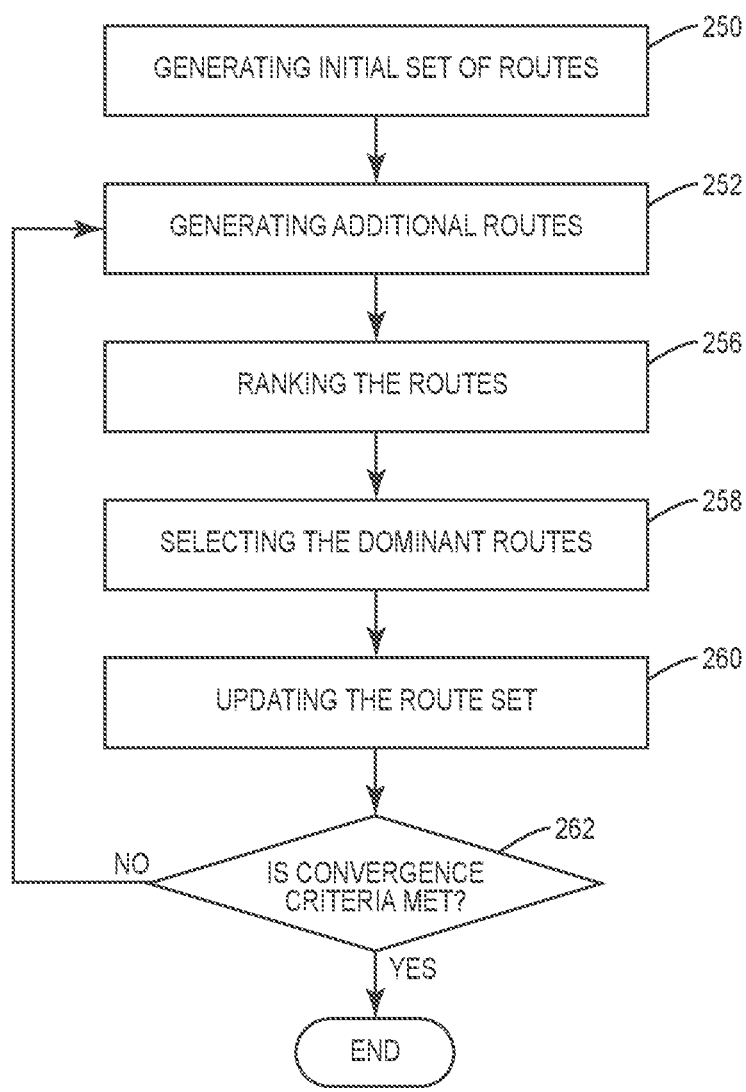
FIG. 15 is a flowchart diagram of a method of creating a set of routes that extend through an airspace between an origination and a destination.

FIG. 15 illustrates another method of developing routes 20 for an aircraft 60 to travel through an airspace 29. The method includes generating an initial set of routes 20 that extend through the airspace 29 (block 250). In one example, the initial routes 20 are referred to as parent routes. Additional routes 20 are then generated (block 252). In one example, the additional routes 20 are referred to as child routes because these additional routes 20 are based on variations of the parent routes 20.

The routes 20 are then evaluated based on the one or more objectives and constraints and are ranked according to the dominance scores (block 256). The method includes selecting the routes 20 that are above a predetermined threshold and considered the dominant routes 20 (block 258). In one example, this includes selecting the routes 20 that have the highest dominance scores (block 258). The set is updated by keeping the dominant routes 20 and eliminating the dominated routes 20 (block 260).

The method continues until a convergence criteria is met (block 262). If the criteria is met, the method ends (block 264). If the criteria is not met, the process continues by generating additional routes 20.

In one example, once the route set is complete, the set is then used to determine a flight path for an aircraft 60 that is scheduled to fly through the airspace 29.

A set of routes 20 can be developed for various reasons. One aspect includes developing a route set for strategic planning. For example, the set is developed to design an airspace 29 around an airport. The route set can apply one or more constraints and objectives to develop the routes 20 that can be utilized within the airspace 29. Another aspect includes tactical applications. The route set can be used to plan arrival and departures for a period of time for an airport. In one example, the acoustic impact of flights can be spread around throughout a day. Another tactical application is use as a flight deck tool to optimize an approach subject to arrival procedures.

The strategic optimization provides for long-term planning, such as when designing an airspace around an airport while the tactical optimization provides for short-term planning, such as day-to-day operation of an airport or individual aircraft. The objectives and constraints can be different depending upon the type of planning that is being used by the system. For example, for a tactical optimization, constraints can include current weather conditions along a route 20 such as a thunderstorm within an area, location of a weather front with high winds, and other aircraft traffic in proximity to the airspace 29 to optimize the selected route 20. Strategic optimization may consider expected growth of a community that is nearby an airport, terrain such as mountains, and long-term weather patterns (e.g., predominant wind directions).

Figure 16:
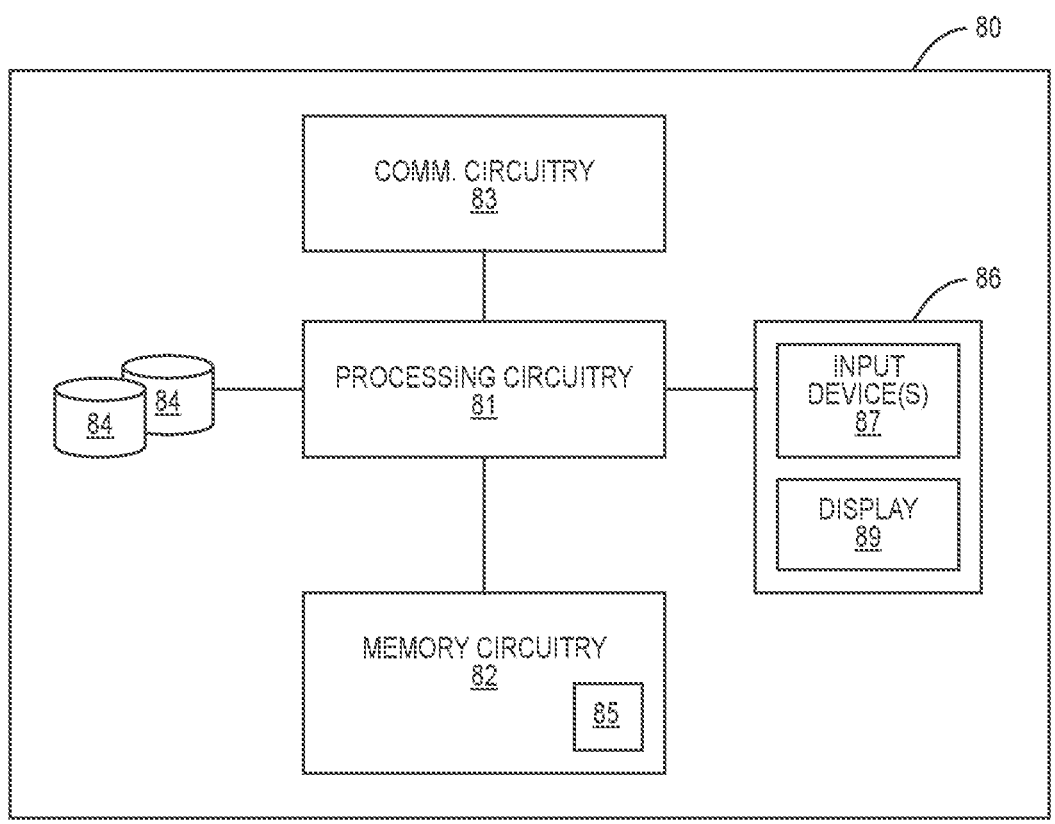
FIG. 16 is a schematic diagram of an optimization system.

FIG. 16 illustrates an control unit 80 for implementing the route optimization. The control unit 80 can be located at various locations, including but not limited to in the aircraft 60, at the airport at one of the origination 100 and destination 105, and a central control such as a Federal Aviation Administration facility which is away from the routes 20.

The control unit 80 includes one or more processing circuitry (illustrated as processing circuitry 81) that may include one or more microprocessors, microcontrollers, Application Specific Integrated Circuits (ASICs), or the like, configured with appropriate software and/or firmware. A computer readable storage medium (shown as memory circuitry 82) stores data and computer readable program code that configures the processing circuitry 81 to implement the techniques described above. Memory circuitry 82 is a non-transitory computer readable medium, and may include various memory devices such as random access memory, read-only memory, and flash memory.

One or more software modules 85 are stored in the memory circuitry 82 for performing various functions of the optimization. In one example, the software module 85 includes an aircraft kinematic module 85 that functions to convert the discrete sections of the routes 20 into a continuous path that is able to be flown by the aircraft 60. In one example, the kinematic module 85 determines fuel usage for each of the routes 20 based on various flight control settings and route settings. A sound propagation module 85 provides for developing and/or analyzing the acoustic impact of various settings of the routes 20.

One or more databases 84 stores information needed for the optimization process. The one or more databases 84 are stored in a non-transitory computer readable storage medium (e.g., an electronic, magnetic, optical, electromagnetic, or semiconductor system-based storage device). The one or more databases 84 can be local or remote relative to the optimization system 80. Examples of different databases 84 include but are not limited to a weather database, population density database, geographic terrain database, geographic obstacles database, aircraft traffic database, arrival and departure procedures database, controlled airspace database, and an aircraft signature vs state database.

Communication circuitry 83 comprises an interface circuit for communicating with remote devices. The communications circuitry 83 can provide connection to both wired and wireless networks. In one example, the communications circuitry 83 includes an interface circuitry for connecting to a wired network or a wireless Wi-Fi or LAN (WLAN).

User interface 86 includes an input device 87 and display 89. The input device 87 and display 89 enables the user to interact with the optimizer system 80. Input device 87 may, for example, comprise a keypad, mouse, other pointing device, or touchpad. The input device or devices 87 allow the user to input commands and data during the operation of the optimization system 80. Display 89 allows the user to see graphical user interfaces and information that is output by the computer programs. In some embodiments, the display 89 may comprise a touch screen display that also functions as a user input device 87. In one example, the display 89 is configured to display the route sets as a Pareto plot of data points.

In one example, one or both of the origination and destination 100, 105 are airports. In another example, one or both are points along a longer flight path. For example, the airspace 29 can extend over a city which is traversed during a longer overall flight of the aircraft 60 with the origination and destination 100, 105 being on opposing sides of the city. In one example as illustrated in FIG. 12, the origination 100 is an airport and the destination 105 is a point away from the airport and distanced from the final destination of the flight.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of creating a route set for an aircraft to travel through an airspace, the method comprising:
   generating the route set comprising routes that each extend through the airspace and each comprises a different flight path through the airspace;
   ranking the routes based on one or more objectives and constraints;
   deleting from the route set one or more of the routes that rank below a predetermined threshold;
   determining that the route set is incomplete and generating additional routes based on the one or more objectives and constraints, the additional routes comprising child routes that each correspond to one or more of the routes and that shift away from the one or more routes with the child routes being different than the routes;
   supplementing the route set with the additional routes that rank above the predetermined threshold;
   selecting one of the routes from the route set; and
   changing an aircraft control setting and flying the aircraft along the selected route through the airspace.

2. The method of claim 1, wherein ranking the routes based on the one or more objectives and constraints comprises for each of the routes:
   calculating an expected acoustic impact of the route on a geographic area using a sound propagation module stored in memory circuitry; and
   ranking the route based on the expected acoustic impact of the route on the geographic area.

3. The method of claim 1, wherein ranking the routes based on the one or more objectives and constraints comprises for each of the routes:
   calculating an expected fuel consumption of the aircraft traveling the route using an aircraft kinematic module stored in memory circuitry; and
   ranking the route based on the expected fuel consumption of the aircraft traveling the route.

4. The method of claim 1, further comprising deleting one or more of the routes from the route set that violate one of the constraints.

5. The method of claim 1, wherein generating the route set comprises:
   creating parent routes that each extend through the airspace;
   assigning one or more waypoints to each of the parent routes;
   varying the parent routes at one or more of the waypoints and creating the child routes that extend through the airspace and that are different than the parent routes; and
   populating the route set with both the parent routes and the child routes.

6. The method of claim 5, wherein varying the parent routes and creating the child routes comprises changing an aircraft control setting at one or more of the waypoints on the parent routes.

7. The method of claim 5, wherein varying the parent routes and creating the child routes comprises changing a direction of the routes at one or more of the waypoints.

8. The method of claim 1, further comprising creating a Pareto set from the routes and ranking the routes based on a graphed position of the routes relative to a leading edge of the Pareto set.

9. The method of claim 8, further comprising ranking the routes based on the graphed position of the routes relative to a gap in the leading edge of the Pareto set.

10. The method of claim 1, wherein changing the aircraft control setting comprises changing one of a flap setting and a throttle setting.

11. A method of creating a route set that comprises a plurality of routes for an aircraft to travel through an airspace, the method comprising:
    populating a route set with routes that extend through the airspace with each of the routes being different;
    ranking the routes based on one or more objectives;
    deleting one or more routes from the route set that rank below a predetermined threshold based on the one or more objectives;
    deleting one or more of the routes that violate a constraint applied to the airspace;
    after deleting the one or more routes, determining that a convergence criteria has not been met;
    creating additional routes that extend through the airspace;
    supplementing the route set with the additional routes;
    selecting one of the routes from the route set; and
    adjusting a control setting on the aircraft and flying the aircraft through the airspace along the selected route.

12. The method of claim 11, wherein ranking the routes based on the one or more objectives comprises ranking the routes based at least on an acoustic impact of the route on a geographic area.

13. The method of claim 12, further comprising ranking the routes based on an expected fuel consumption of the aircraft traveling along the route.

14. The method of claim 11, wherein deleting one or more of the routes that violate the constraint applied to the airspace comprises deleting the one or more routes that extend into a prohibited airspace.

15. The method of claim 11, further comprising creating a Pareto set from the routes and ranking the routes based on a graphed position of the routes relative to a leading edge of the Pareto set.

16. The method of claim 11, wherein adjusting the aircraft control setting comprises changing one of a flap setting and a throttle setting.

17. A control unit to develop routes for an aircraft to travel through an airspace, the control unit comprising:
    interface circuitry configured to receive one or more objectives and one or more constraints for the routes; and
    processing circuitry configured to optimize the routes, the processing circuitry configured to:

generate a route set comprising a plurality of routes that each extends through the airspace and each comprises a different flight path through the airspace;

rank the routes based on the one or more objectives and constraints;

delete from the route set one or more of the routes that rank below a predetermined threshold;

supplement the route set with the additional ones of the routes that rank above the predetermined threshold;

create a Pareto set from the routes;

rank the routes based on a position of the routes relative to a leading edge of the Pareto set; and change a control setting of the aircraft to cause the aircraft to travel through the airspace along a selected one of the routes.

18. The control unit of claim 17, wherein the processing circuitry is further configured to display the route set as the Pareto set on a display.

19. The control unit of claim 17, wherein the processing circuitry is configured to rank the routes based on an acoustic impact of the routes on a geographic area.

20. The control unit of claim 19, wherein the processing circuitry is configured to rank the routes based on fuel consumption of the aircraft traveling the routes.

* * * * *